United States Patent [19]
Zingery

[11] 3,807,866
[45] Apr. 30, 1974

[54] RING LASER GYROSCOPE HAVING A CONSTANT OUTPUT BEAT-FREQUENCY

[75] Inventor: Wilbur L. Zingery, Long Beach, Calif.

[73] Assignee: Rockwell International Corporation, El Segundo, Calif.

[22] Filed: Apr. 21, 1972

[21] Appl. No.: 246,191

[52] U.S. Cl. .......................................... 356/106 LR
[51] Int. Cl. ................................................ G01b 9/02
[58] Field of Search .............................. 356/106 LR

[56] References Cited
UNITED STATES PATENTS
3,642,375   2/1972   Macek ......................... 356/106 LR

*Primary Examiner*—David Schonberg
*Assistant Examiner*—J. P. McGraw
*Attorney, Agent, or Firm*—H. Frederick Hamann; George Jameson; Rolf M. Pitts

[57] ABSTRACT

A ring laser gyroscope having counter-rotating beams rotating around a closed path. A laser gain section is provided for generating the counter-rotating beams. A means for generating and applying a magnetic field to a Faraday substance which substance is located within the optical path of the counter-rotating beams provides a selected bias to the optical beams. Means for combining and detecting a portion of the counter-rotating beams outside of the closed path yields a first signal which contains inertial rotation rate and Faraday bias information. Means for detecting selected components of the laser beams outside of the closed path yields a second signal that contains Faraday bias information but does not contain rotation rate information. A servo means responsive to the first electrical signal generates a control signal which signal is applied to the means for generating a magnetic field to create an operating condition that is held constant to thereby eliminate scale factor nonlinearities and stray field errors in the detected gyroscope rates. A means for correcting the frequency of the first signal by an amount determined by the frequency of the second signal is provided to yield a rotation rate devoid of Faraday bias or scale factor nonlinearity errors.

8 Claims, 7 Drawing Figures

PRIOR ART

FIG. 3

CIRCULAR POLARIZED
BEAM FROM RING LASER

RING LASER GYROSCOPE HAVING A CONSTANT OUTPUT BEAT-FREQUENCY

BACKGROUND OF THE INVENTION

1. Field of the Invention

This invention relates to ring laser gyroscopes and, more particularly, to a servo biasing technique for maintaining a constant output beat-frequency.

2. Description of the Prior Art

In U.S. Pat. No. 3,508,831, entitled "Ring Laser Having Minimized Frequency Locking Characteristics," by W. M. Macek, there is disclosed a Faraday bias element for producing a beat-frequency between two counter-rotating beams of a ring laser such that the frequency offsetting prevents the ring laser from operating in the frequency locking region for all contemplated values of angular rotations. Circularly polarized light impinges upon a Faraday rotator cell which cell is magnetically biased by means of a winding to exhibit birefringence to circularly polarize light passing through the cell in opposite directions of propogation. The light passing, for example, counterclockwise, then traverses a different path length than the light traversing the ring in a clockwise direction, which different path lengths cause a difference in frequency between the counter-rotating beams and, hence, a finite beat signal in the absence of any rotation of the total laser. The Faraday element disclosed in the referenced patent is of a variable bias type which acts to maintain a constant output frequency regardless of the inertial rotation rate.

In U.S. Pat. No. 3,373,650, entitled "Laser Angular Rate Sensor," by Joseph E. Killpatrick, there is disclosed a bias system for use with a ring laser in which the laser is electrically or mechanically oscillated so that it is effectively operated above the threshold rate for a majority of the time.

In U.S. Pat. application Ser. No. 882,408, entitled "Modulation Servo Control for Frequency Modulated Ring Laser Gyro," by Thomas J. Hutchings, which application is assigned to North American Rockwell Corporation, there is disclosed means for using the difference frequency output of a laser gyroscope to generate a servo control signal indicative of any departure from the predetermined optimum modulation index. This control signal is then utilized to maintain the optimum modulation index. Specifically, the second harmonic content of the difference frequency signal is zero at the optimum modulation index, therefore, this signal is detected and used to control the frequency or depth of modulation of the modulated signal to drive the second harmonic content of the output towards zero.

Helpful in understanding several features of the present invention are the following publications:

In a publication entitled "Optics," by A. Sommerfeld, Academic Press, 1954, New York, N.Y. pp 101–109, is described the Faraday effect and the Zeeman effect, physical principles which are applied in novel combinations in the present invention.

In a publication "Beats Produced by Negative Faraday Effect in Infrared Lasers," by G. J. Burrell, et al., Infrared Physics, 1968, Vol. 8, pp 199–208 is described particular experiments performed, using the Faraday effect of a gas discharge in generating oppositely directed elliptically polarized waves in a ring laser. In this publication, a particular mechanization is described whereby the oppositely directed waves have the same sense of polarization as in conventional laser gyroscopes with the waves of opposite polarization supressed. This publication is helpful in understanding the behavior of the Faraday effect in lasers, but the described ring laser suffers from the usual laser gyroscope errors if it were implemented as a gyroscope. The present invention also utilizes the Faraday effect in a gas laser, but only in combination with other components and techniques to eliminate stray field sensitivity and nonlinearities.

In the publication "Zeeman Effects in Gaseous He—Ne Optical Masers," by R. Paananen, et al., Proc. IEEE, January 1963, is illustrated the behavior and detection of combinations of polarized components from a laser. Such illustrations are helpful in understanding some of the features of the novel combinations and polarization manipulation schemes which form a part of the present invention.

In the publication "Polarization Properties of Optical Resonators Passive and Active," by H. deLang, Philips Research Reports Supplements, No. 8, pp 17–20, 1967, is described the theory of the possible existence of oppositely directed traveling waves in a ring laser with waves of opposite polarization sense propagating in each direction. The theory so described displays the basic equations of the ring laser with bias and shows that the solution of the simultaneous equations may result in the elimination of undesirable terms in the equations. The equations described in this publication relate the traveling wave frequencies to rotation rate and other bias and are fundamental to all laser gyroscopes. This publication is helpful in understanding the reason for the implementation of the combination of components, electronic servo systems and particular polarization manipulations which are part of the present invention and which serve to eliminate the serious laser gyroscope errors such as scale-factor nonlinearities.

Each of the aforementioned bias schemes can be affected with stray magnetic fields and scale-factor nonlinearities which are unrelated to inertial rotation rate, but which provide erroneous output indications. It would, therefore, be highly desirable to have a servo-bias type laser wherein stray field effects are eliminated and wherein the output beat-frequency value is held to a constant to achieve a highly linear gyroscope scale-factor.

SUMMARY OF THE INVENTION

In one preferred embodiment of the invention, there is provided a ring laser gyroscope having a pair of counter-rotating beams emanating from a laser gain section. Each counter-rotating beam is composed of two circular polarized components, of opposite sense of polarization, which are generally at different optical frequencies. A Faraday element is positioned in the optical path of the two counter-rotating beams with a means for applying a magnetic field to the Faraday element so as to create an optical bias in response to a control signal. Means are provided for measuring the optical frequency difference between counter-rotating beams and between circular polarized waves which are propagating in the same direction in the ring laser. The former is a measure of inertial rotation rate plus Faraday bias, whereas the latter is a measure of Faraday bias only. Combining and detecting means are positioned external of the ring laser to receive and combine portions of the two counter-rotating beams so as to form a composite beam. Detector means, positioned in the path of the combined beams, transforms the combined beams into a proportional electrical signal. A servo means, responsive to the proportional signal, applies a biasing control signal to the Faraday element to maintain the output beat-frequency level at a preselected value. External to the laser path is a polarizing means for receiving a portion of one of the counter-rotating beams. A detector senses the portion of the counter-rotating beam passing through the polarizer and provides an output signal proportional thereto. The frequency of the output beam so detected is a measure of the magnetic field induced Faraday bias.

It is, therefore, a principal object of this invention to provide a servo control for maintaining the output beat-frequency of the ring laser gyroscope at a substantially constant value.

It is another object of the present invention to provide means for separating the part of the output beat frequency caused by inertial rotation and the part of the output beat-frequency caused by an applied bias.

It is another object of the present invention to provide means for using magnetic fields, including stray magnetic fields, to maintain the output beat-frequency at a preselected value and thereby eliminate gyroscope errors caused by stray magnetic fields and scale factor nonlinearities.

It is another object of the present invention to provide means for eliminating laser gyroscope errors associated with frequency locking or FM sidebands.

These and other objects of the present invention will become more apparent when taken in conjunction with the following description and drawings in which like characters indicate like parts and which drawings form a part of this invention.

DESCRIPTION OF THE PREFERRED EMBODIMENTS

Figure 1:
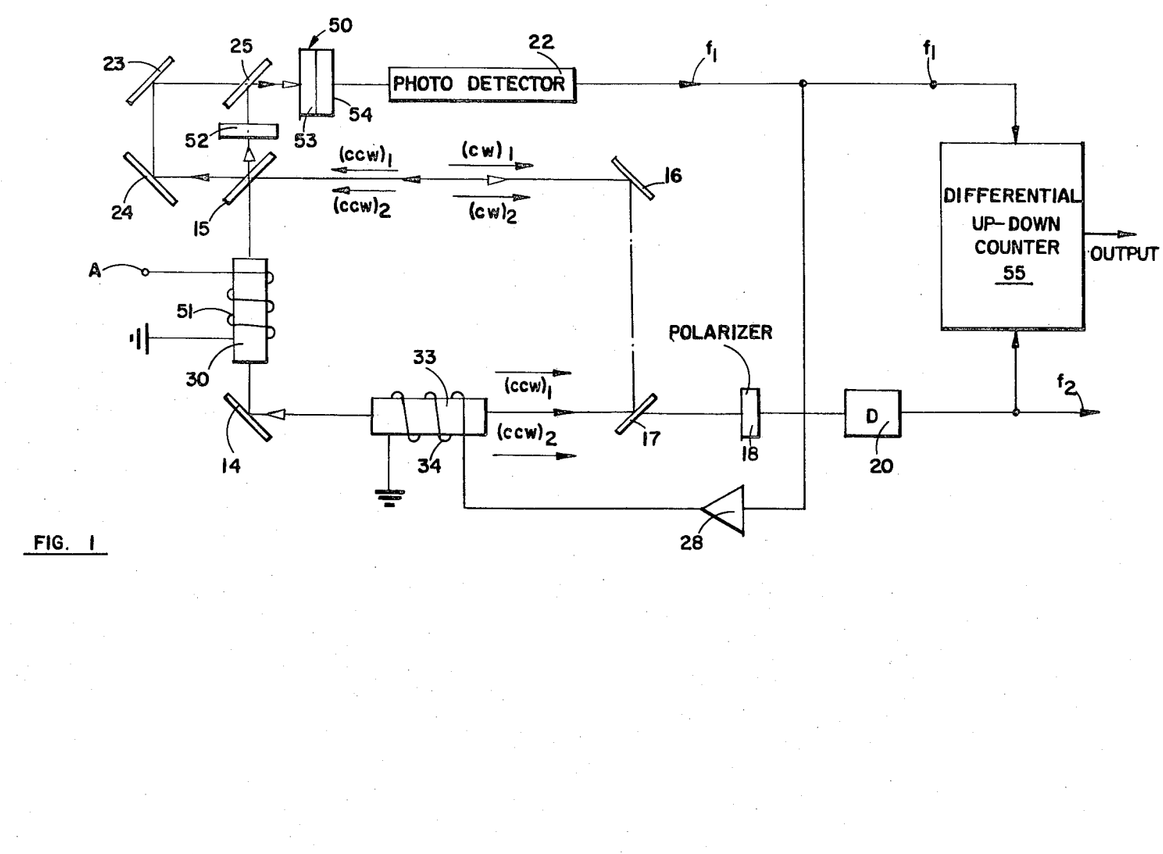
FIG. 1 is a block diagram of the optical configuration of the present ring laser gyroscope.

Referring now to FIG. 1 wherein there is shown a ring laser type gyroscope in which a laser gain medium 30, which operates in conjunction with totally reflective mirrors 16 and 14, and partially reflective mirrors 15 and 17, to create two counter-rotating beams depicted with white and black arrowheads. The beams which circulate in the laser are circularly polarized. A Faraday rotator 33 is positioned in the path of the circularly polarized beams and through the effect of a magnetic field applied by means of a biasing coil 34, each of the circularly polarized waves experiences a phase shift which depends upon the direction of the sense of polarization, the magnetic field direction and the propogation direction of each wave. In the ring laser, this phase shift results in a frequency tuning of the laser and a difference frequency between the separate circular polarized traveling waves. This action is similar to the usual Faraday bias disclosed in prior art laser gyroscopes wherein the prior art utilizes only one circular polarized component of each counter-rotating beam ($CW_1$ and $CCW_1$ in FIG. 1); such circular component being established by the conventional use of quarter-wave plates. The Faraday nonreciprocal phase shift and the resulting difference frequency is a common bias in the prior art and in the proposed invention. In operation as a gyroscope, all of the elements shown are generally affixed together in a housing with the housing affixed to a movable platform. Rotation of the platform about an axis extending perpendicular from the paper causes a beat-frequency output from the two counter-rotating beams. Coil 51 generates a magnetic field in the axial direction of the laser gain substance for the purpose of sustaining circular polarization of the traveling waves in the ring laser. Each of the counter-rotating beams is comprised of a right circular polarized component and a left circular polarized component with each component generally having a different optical frequency. These frequencies are designated $CCW_1$ and $CCW_2$ for the counterclockwise beam and $CW_1$ and $CW_2$ for the clockwise beam.

In FIG. 1, consider the waves $CCW_1$ and $CW_1$ to have the same sense of polarization with respect to the propagation direction. A portion of these waves, $CCW_1$ and $CW_1$, are extracted from the laser, combined and mixed in a photodetector for the purpose of detecting inertial rotation rate plus Faraday bias. A portion of the waves, $CCW_1$ and $CCW_2$, which have opposite sense of polarization, are extracted from the laser and detected to yield a difference frequency which depends on Faraday bias but not on inertial rotation rate. The measurement of these two difference frequencies then allows for a determination of the inertial rotation rate, such determination accomplished by conventional computations or automated digital counting techniques.

Figure 2A:
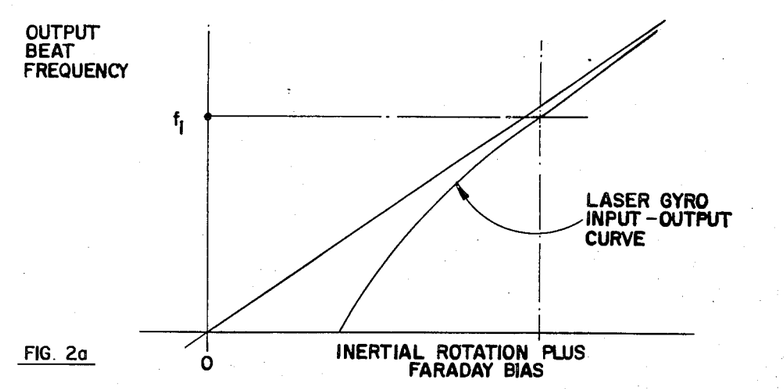
FIGS. 2a, 2b and 2c are graphs useful in understanding the operation of the preferred embodiment.
Figure 2B:
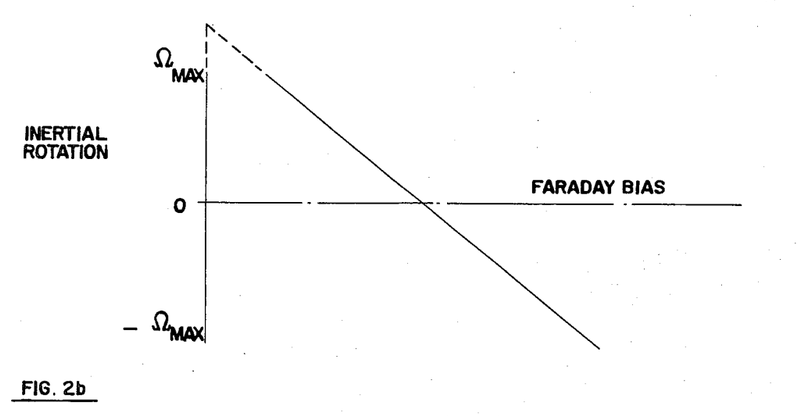
Figure 2C:
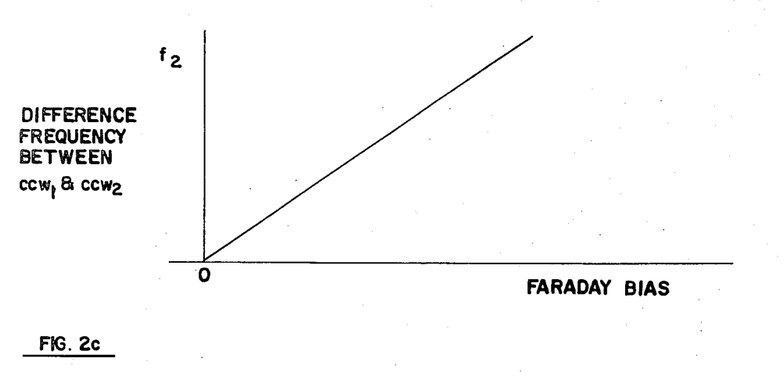

Partially reflecting mirror 15 allows a portion of the two counter-rotating beams to be admitted from the cavity. Mirrors 23, 24 and 25 combine the two beams into a composite beam which is then fed to a photodetector 22 through a polarization selector 50. A half-wave plate 52 reverses the sense of polarization of the CW waves. The photodetector 22 converts the selected optically combined beam into a proportional electrical signal $f_1$, shown in FIG. 2a. The a-c signal is then fed to a servo amplifier 28, the output of which drives the biasing coil 34 to increase or decrease the magnetic field H so as to maintain the frequency $f_1$ at a constant value, shown in FIGS. 2a and 2b. A portion of the counterclockwise rotating beam, comprised by $CCW_1$ and $CCW_2$, is removed from the laser cavity by means of the partially reflective mirror 17 and allowed to pass through a polarizer 18. The polarizer 18 periodically transmits the resultant of these two circular polarized waves to a photodetector 20. The photodetector converts the resultant beam into an electrical proportional signal having a freuquency $f_2$ which is the difference frequency between $CCW_1$ and $CCW_2$, shown in FIG. 2c. A differential digital counter 55 receives at its inputs the signals $f_1$ and $f_2$. The difference between these two signals is a signal $f_r$ which is proportional to the rate of rotation of the laser gyroscope assembly.

Figure 3:
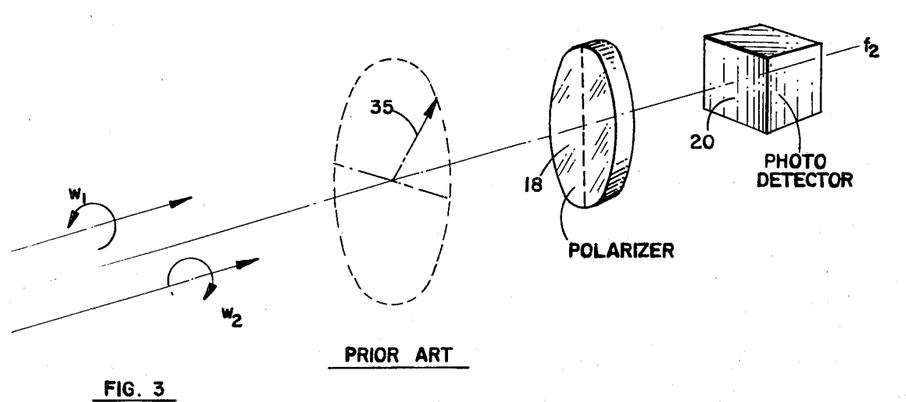
FIG. 3 is a perspective view of a portion of the optics used in the preferred embodiment of FIG. 1.

FIG. 3 shows how the difference frequency between the circular polarized components $CCW_1$ and $CCW_2$, which are propagating in the same direction in the ring laser, namely, counterclockwise, are measured. The two waves of frequency $w_1$ and $w_2$ are coincident, but are shown separated for purposes of clarity. The frequency difference $w_1$ minus $w_2$ is independent of vehicle rotation rate and depends only on the bias magnetic field which includes any stray fields and which is adjusted to cause operation at a fixed heterodyne frequency. The $w_1$ and $w_2$ waves result in a rotating plane wave 35 which has a frequency of rotation of one-half $w_1$ minus $w_2$. The rotating plane wave passes through the polarizer 18 to form a plane wave with intensity fluctuations equal to $w_1$ minus $w_2$. The intensity fluctuations are detected by photodetector 20 and transformed into the proportional fluctuating signal of frequency $f_2$. With the output beat-frequency $f_1$ maintained at a constant by servo 28, the rate of amplitude modulation, $f_2$, will be a measure of the applied Faraday bias, including stray magnetic field, and hence, will allow compensation of this bias in the heterodyne signal $f_1$ which contains both inertial rotation rate and Faraday bias. It is a feature of this invention that the compensating frequency $f_2$ is derived from the same effect which produces the Faraday bias; hence the coefficients involved in producing the Faraday effect need not be constant. Other analog schemes, such as measurement of the Faraday coil current, require prohibitive accuracy of measurement. The Faraday substance 33 may be a material with a large Verdet constant such as lithium silicate with a large percentage of terbium, or the substance 33 may be the gain substance 30 whereby the discharge exhibits a negative Faraday effect. The Faraday substance may be a combination of an active gain substance and a Faraday rotation substance.

It will be appreciated that the detection of the Faraday bias alone (FIG. 3) may be performed by other direct digital techniques such as Faraday magnetic field measurement by magnetic resonance experiments on the participating atoms. The separation of the Faraday bias frequencies, as determined by the output $f_2$, from the combination of inertial rotation and Faraday effects resulting in the constant frequency $f_1$, may be performed by well-known and conventional digital techniques.

The waves which are normally used in laser gyroscopes to detect rotation plus bias have the same sense of circular polarization with respect to their direction of propogation while propogating in the Faraday element. If these waves are combined outside the ring and passed through a λ/4-plate, they will be plane polarized in the same direction. The other two waves, of the opposite handedness, will have plane polarization normal to the first set. In this way, one pair may be selected for heterodyne by means of a polarizer.

Figure 4:
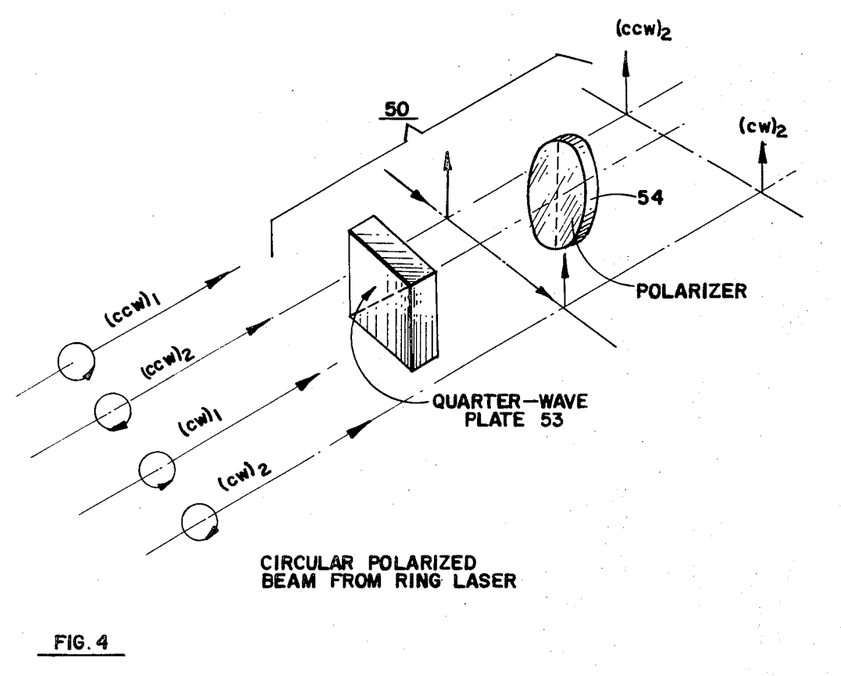
FIG. 4 is a perspective view of a portion of the optics used in the laser embodiment of FIG. 5.

FIG. 4 shows the polarization selector 50 comprised of the quarter wave plate 53 and the polarizer 54. The circular polarized waves, after combining external to the laser, are shown separated for clarity. Each circular polarized wave is changed into a linear polarized wave upon passing through the wave-plate 53. The polarizer 54 is then used to select the components for detection in the photodetector 22. Other polarization manipulations may be used in variations of the invention: the sense of polarization may be reversed upon reflection, or upon transmission through a half-wave plate; a selected set of waves, say $CCW_1$ and $CCW_2$, may be reversed in sense of polarization before combining with $CW_1$ and $CW_2$. As a result of the implementation of well known polarization manipulation processes, one may select any pair of the four waves for frequency difference measurement. The half-wave plate 52 is used to reverse the polarization sense of the CW wave only if the mirror arrangement used external to the ring causes a relative change in the polarization sense of the CW and CCW beams when observed at the polarization selector.

The implementation of the proposed invention may be accomplished without the use of the Faraday substance 33 and the coil 34, using the gain substance 30 and the coil 51 as the primary Faraday bias components. If the Faraday substance 33 and the coil 34 are omitted, then the coil 51 would be connected into the feedback loop in place of coil 34.

Figure 5:
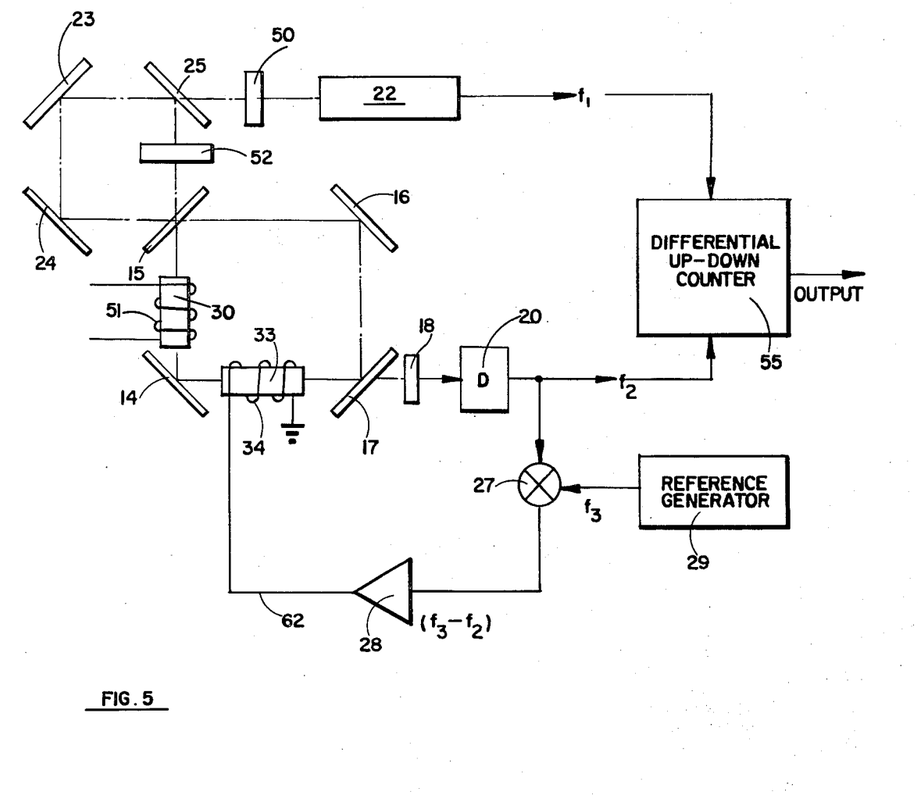
FIG. 5 is a block diagram of an optical configuration of a laser gyroscope.

Referring now to FIG. 5 wherein is shown a second embodiment of the ring laser gyroscope, which is identical to the embodiment shown in FIG. 1 except for the fact that the servo loop is now connected between the output of photodetector 20 and the input to the magnetic coil 34. In the servo feedback loop, there can be inserted a summing means 27 for subtracting a reference signal $f_3$ from a reference generator 29 to the feedback signal $f_2$ before it reaches the output of the servo electronics 28 so as to affect a variation of the fed-back signal. In this particular embodiment, the frequency difference between the $CCW_1$ and $CCW_2$ beams is held to a constant. Any deviation from a preselected reference frequency $(f_3 - f_2)$ causes the feedback electronics 28 to increase or decrease the amount of current to be fed to the Faraday coil 34. From the knowledge of the value of the highly stable reference frequency $f_3$, this frequency can be subtracted from the frequency $f_1$ (inertial rotation rate plus Faraday bias) to yield the rotation rate.

In this particular embodiment, the Faraday bias contribution to the output beat frequency $f_1$ is held constant by means of a feedback loop. Because the Faraday bias frequency can be measured very accurately by means described herein, the inertial rotation rate can be determined by subtracting the Faraday bias frequency from the output beat frequency $f_1$.

The advantage of the proposed Faraday bias type laser gyroscope over other types of Faraday bias is the accurate determination and control of the bias. Prior art bias relies on optical, thermal and mechanical stability of the Faraday bias components, whereas the proposed invention detects the bias frequency directly and measures it with reference to a highly stable oscillator.

While the invention has been described with respect to particular physical embodiments, it will be apparent to those skilled in the art that various modifications and improvements may be made without departing from the scope and spirit of the invention. For example, the present technique can be employed with essentially any type of ring laser device. Accordingly, it is to be understood that the invention is not to be limited by specifically illustrated embodiments, but only by the scope of the appended claims.

What is claimed is:

1. A ring laser gyroscope comprising in combination:

means for generating two counter-rotating beams of circularly polarized light about a closed optical path each of said beams having a first component polarized in a first sense and a second component polarized in a second sense different from said first sense;

a Faraday substance positioned in said closed optical path;

means for generating a magnetic field in said Faraday substance;

first means for sampling said counter-rotating beams and selecting a like polarized component from each of said beams;

means for heterodyning the selected components of said counter-rotating beams together;

means for transforming the heterodyned beams into a first proportional electrical signal;

servo means for receiving said first proportional electrical signal and providing a control signal to said means for generating a magnetic field so as to control the strength of said magnetic field to maintain said proportional electrical signal at a constant value;

second means for sampling one of said counter-rotating beams;

means for transforming the first and second components of the sampled beam from said second means into a second proportional electrical signal; and means for obtaining a difference signal between said first and said second proportional electrical signals which difference signal is proportional to the rate of rotation of said laser gyroscope.

2. The ring laser gyroscope according to claim 1 wherein said means for transforming the sampled beam from said second means is comprised of:

a polarizer positioned in the path of said sampled beam so as to transform said circularly polarized beam into a linear polarized beam; and a photodetector positioned to receive the linear polarized beam and to connect the linear polarized beam into a proportional electrical signal.

3. A ring laser gyroscope comprising:

means for generating two circularly polarized counter-rotating beams of light about a closed loop optical path each of said beams having a first component polarized in a first sense and a second component polarized in a second sense different from said first sense;

means positioned in said optical path for applying a bias to said counter-rotating beams;

means for sampling said two counter-rotating beams and selecting a like polarized components from each of said beams and combining the selected components into a heterodyned beam having a beat frequency; and servo means responsive to said heterodyned beam for controlling the applied bias so as to maintain the beat frequency of said heterodyned beam at a constant value.

4. The ring laser gyroscope according to claim 3 wherein said means for sampling said two counter-rotating beams is comprised of:

a partially transparent reflector positioned in said closed loop optical path to allow the clockwise beam and the counterclockwise beam to transverse different paths external to the closed loop optical path;

means for optically combining the two counter-rotating beams external of said closed loop optical path;

a half-wave plate interposed in the path of one of the beams passed by said partially transparent reflector;

a quarter-wave plate positioned in the path of said optically combined beams;

a polarizer positioned in the path of the beam from said quarter wave plate; and photodetector means for transferring the beam passed by said polarizer into an electrical signal.

5. The ring laser gyroscope according to claim 3 wherein said means positioned in said optical path for applying a bias is comprised of:

a Faraday rotational element;

magnetic means for creating a magnetic field in said Faraday element which magnetic field is parallel to the axis of the counter-rotating optical beams passing thru the Faraday element; and wherein said servo means controls the magnitude of the magnetic field generated by said magnetic means.

6. A ring laser gyroscope comprising:

means for generating two circularly polarized counter-rotating beams of light about a closed loop optical path each of said beams having a first component polarized in a first sense and a second component polarized in a second sense different from said first sense;

means positioned in said optical path for applying a bias to said counter-rotating beams;

means for sampling said two counter-rotating beams and selecting a like polarized component from each of said beams and combining the selected components into a heterodyned beam having a beat frequency;

means for sampling one of said two counter-rotating beams;

servo means responsive to said one sampled beam for controlling the applied bias so as to maintain said one sampled beam at a constant value; and means responsive to said beam having a beat-frequency and said one sampled beam to provide a signal proportional to the rate of rotation of said ring laser gyroscope.

7. The ring laser gyroscope according to claim 6 wherein said means for sampling said two counter-rotating is comprised of:

a partially transparent reflector positioned in said closed loop optical path to allow the clockwise beam and the counterclockwise beam to transverse different paths external to the closed loop optical path;

means for optically combining the two counter-rotating beams external of said closed loop optical path;

a half-wave plate interposed in the path of one of the beams passed by said partially transparent reflector;

a quarter-wave plate positioned in the path of said optically combined beams;

a polarizer positioned in the path of the beam from said quarter-wave plate; and photodetector means for transferring the beam passed by said polarizer into an electrical signal.

8. The ring laser gyroscope according to claim 6 wherein said means positioned in said optical path for applying a bias is comprised of:

a Faraday rotational element;

magnetic means for creating a magnetic field in said Faraday element which magnetic field is parallel to the axis of the counter-rotating optical beams passing thru the Faraday element; and wherein said servo means controls the magnitude of the magnetic field generated by said magnetic means.

* * * * *

PO-1050
(5/69)

UNITED STATES PATENT OFFICE
CERTIFICATE OF CORRECTION

Patent No. 3,807,866            Dated April 30, 1974

Inventor(s) Wilbur L. Zingery

It is certified that error appears in the above-identified patent and that said Letters Patent are hereby corrected as shown below:

Column 7, line 49, "components" should read --component--;
           line 62, "transverse" should read --traverse--.
Column 8, line 46, after "rotating" and before "is" insert --beams--;
           line 49, "transverse" should read --traverse--.

Signed and sealed this 8th day of October 1974.

(SEAL)
Attest:

McCOY M. GIBSON JR.            C. MARSHALL DANN
Attesting Officer                Commissioner of Patents